United States Patent [19]

Diamond et al.

[11] 4,336,241

[45] Jun. 22, 1982

[54] PROCESS FOR HYDROGEN PEROXIDE PRODUCTION FROM HYDROGEN AND OXYGEN

[75] Inventors: Steven E. Diamond, New Providence, N.J.; Benjamin S. Tovrog, Naperville, Ill.; Frank Mares, Whippany; Reginald T. Tang, Bridgewater, both of N.J.

[73] Assignee: Allied Corporation, Morris Township, Morris County, N.J.

[21] Appl. No.: 244,844

[22] Filed: Mar. 18, 1981

[51] Int. Cl.³ .............................................. C01B 15/02
[52] U.S. Cl. .................................................... 423/588
[58] Field of Search ........................ 423/588, 589, 590

[56] References Cited

U.S. PATENT DOCUMENTS 3,887,490 6/1975 Schreyer et al. ..................... 423/588
3,912,766 10/1975 Logan et al. ......................... 423/588

OTHER PUBLICATIONS

Nature, vol. 265 of 1977, pp. 229–230.

Primary Examiner—O. R. Vertiz
Assistant Examiner—Wayne A. Langel
Attorney, Agent, or Firm—Alan M. Doernberg; Gerhard H. Fuchs

[57] ABSTRACT

Hydrogen peroxide production by oxidation of a 2-alkyl-9,10-dihydroxyanthracene, especially the 2-(t-butyl) compound, and catalytic hydrogenation of the resulting 2-alkylanthraquinone back to the dihydroxy compound, using a water-insoluble (bipyridyl) rhodium complex as hydrogenation catalyst. Especially such process carried continuously in a cell in which an organic phase is separated by a porous membrane from an aqueous phase, and the anthraquinone is hydrogenated on the organic side of the cell and hydrogen peroxide is obtained from the aqueous phase. Preferably the rhodium complex is formed with a bipyridyl ligand attached to polystyrene beads, whereby to assure that rhodium is not carried into the hydrogen peroxide production side of the cell.

5 Claims, 1 Drawing Figure

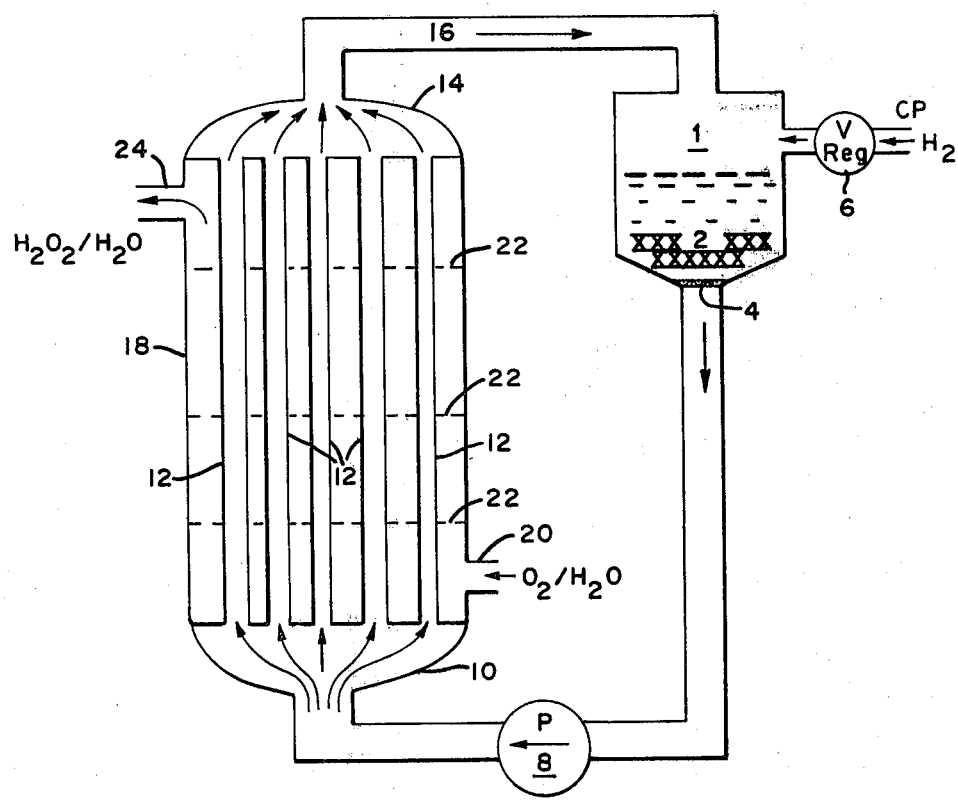

PROCESS FOR HYDROGEN PEROXIDE PRODUCTION FROM HYDROGEN AND OXYGEN

DESCRIPTION

BACKGROUND OF THE INVENTION

This invention relates to a continuous process for production of hydrogen peroxide from hydrogen and oxygen gases.

Such process which has been used commercially involves two stages of operation, one being an oxidation stage in which a 2-alkyl-9,10-dihydroxyanthracene is contacted with oxygen gas in an organic solvent whereby the alkyldihydroxyanthracene is oxidized to the corresponding alkylanthraquinone and to hydrogen peroxide coproduct which is recovered by extraction with water; and a reduction stage in which the said alkylanthraquinone is catalytically reduced by hydrogen back to the alkyldihydroxyanthracene starting material.

Among disadvantages of this process are the fact that the hydrogenation catalysts employed (specifically palladium on alumina) tend to produce hydrogenation of the anthraquinone ring as well as the desired hydrogenation back to the dihydroxyanthracene compound; that the hydrogenation catalyst, to the extent carried over into the oxidation stage, acts to decompose hydrogen peroxide product; and that the water, used to extract out the hydrogen peroxide products, tends to form emulsions with the organic solvent.

It has been disclosed in the literature that complexes of rhodium with bidentate nitrogen-containing chelating ligands are useful hydrogenation catalysts both for ketones, including aromatic ketones such as acetophenone, and for olefinic bonds. (J. Organomet. Chem. vol. 140 of 1977, pp. 63–72; ibid. vol. 157 of 1978, pp. 345–352). In hydrogenation of alkylanthraquinones to the dihydroxyanthracenes it is important that the hydrogenation be highly selective for the ketone group vs. the anthraquinone rings. The above literature indicates that high selectivity may be observed for ketone or for olefinic bond hydrogenation, depending on the substrate to be hydrogenated and on the complex used.

It has been proposed to carry out redox processes across membranes by use of quinone-type carriers (Nature, Vol. 265 of 1977, pages 229–230). Such processes, specifically, used a diphenyl ether membrane supported on a filter of cellulose nitrate and containing a suitable carrier molecule, specifically 2-methyl-1,4-naphthoquinone. An aqueous solution of sodium dithionite or ascorbic acid reducing agent was separated from an aqueous solution of potassium ferricyanide by the diphenyl ether membrane containing the carrier molecule. Occurrence of electron transfer through the membrane was demonstrated by observation of the reduction of the ferricyanide to the ferrocyanide form, when the quinone carrier molecule was included in the membrane.

SUMMARY

In accordance with this invention, an improved process is provided for production of hydrogen peroxide involving oxidation by contact with elemental oxygen of a 2-alkyl-9,10-dihydroxyanthracene, dissolved in an organic solvent, to hydrogen peroxide and the corresponding alkylanthraquinone, and catalytic reduction with elemental hydrogen of the resulting dissolved alkylanthraquinone back to said alkyldihydroxyanthracene. The improvement, broadly stated, comprises carrying out the step using as hydrogenation catalyst, a water-insoluble (bipyridyl)rhodium complex. More particularly, the oxidation stage and the reduction stage are carried out, preferably simultaneously and continuously, in adjoining zones in the same reaction vessel, using a porous membrane separating said zones which membrane is wetted and penetrated by a solution in organic solvent of said alkyldihydroxyanthracene, and using the above stated hydrogenation catalyst in the reducing zone. On the other side of the membrane, the hydrogen peroxide product is dissolved in a water/oxygen phase, which is withdrawn for recovery of hydrogen peroxide.

The alkylanthraquinone, together with hydrogenation catalyst and with organic solvent for the alkyldihydroxyanthracene, is supplied to a zone to which the elemental hydrogen for the reduction stage is supplied; and in the adjoining zone, water and the said elemental oxygen are supplied. The porous membrane functions to separate the two zones, so that the hydrogen and oxygen introduced into the zones do not mix whereby an explosive mixture could be formed. Because the hydrogenation catalyst is water-insoluble, it is not carried over from the hydrogenation zone into the oxidation zone where hydrogen peroxide is being formed.

The alkyldihydroxyanthracene in the solution penetrating said membrane reacts at the interface with oxygen in the aqueous oxidation zone to transfer hydrogen ions and electrons with formation of hydrogen peroxide and alkylanthraquinone. At the reduction zone, the oxidized alkylanthraquinone is catalytically reduced by incoming hydrogen gas to regenerate the alkyldihydroxyanthracene. The required hydrogen ions and electrons are transferred via electron and proton transfer rather than by diffusion of the reduced (2-alkyldihydroxyanthracene) and the oxidized (2-alkylanthraquinone) forms from one to the other side of the membrane.

DRAWING

The drawing is a diagramatic flow sheet showing apparatus components and processing operations in accordance with this invention.

DETAILED DESCRIPTION

In accordance with this invention, the (bipyridyl)-rhodium complexes promote quantitative and sufficiently rapid hydrogenation to the desired dihydroxyanthracenes without causing hydrogenation of the alkylanthraquinone rings.

The rhodium bipyridyl complex hydrogenation catalyst can be used as such in solution in the organic phase, or can be bound to a polymer, such as polystyrene in bead form. The size of such beads assures that the catalyst can be retained in the hydrogenation zone and will not be carried into the oxidation zone.

Bases are advantageously included in the hydrogenation reaction mixture when using rhodium (III) bipyridyl complexes. Suitable bases include anion exchange resins, inorganic bases such as sodium hydroxide, and organic bases such as trimethylbenzylammonium hydroxide to convert the complex from the salt form in which it is conveniently produced into more active form. The anion exchange resins are preferred as resisting extraction into the aqueous phase. With rhodium (I) complexes such base is not needed.

Solvents which can be used in the process of the invention are 50:50 mixtures by volume of benzene/higher alcohols of 7–11 carbon atoms as in the above-noted commercial operations; also 50:50 by volume mixtures of methanol and tetrahydrofuran ("THF"). A particularly suitable solvent is a mixture, especially a 60:40 by volume mixture, of diisobutylcarbinol and alpha-methylnaphthalene. Diphenyl ether can also be used.

The membrane employed must be one which is wetted and penetrated by the solution of alkyldihydroxyanthracene. It has been found that membranes having a cellulosic composition are suitable, such as cellulose nitrate or cellulose nitrate/acetate.

2-Alkyldihydroxyanthracenes which can be used in the process of this invention include 2-ethyldihydroxyanthracene as in the above-noted commercial operations and more preferably 2-(t-butyl)-9,10-dihydroxyanthracene. These compounds are also called 2-ethyl- and 2-(t-butyl)anthrahydroquinone respectively, abbreviated as "EAHQ" and "BAHQ". The corresponding oxidation products are 2-ethyl- and 2-(t-butyl)anthraquinone, "EAQ" and "BAQ".

The examples which follow are illustrative of the invention and of the preferred mode contemplated by the inventors for carrying out the invention but are not to be interpreted in a limiting sense.

EXAMPLE 1

A rhodium(III) bipyridyl complex, [(bipy)$_2$RhCl$_2$]Cl.2H$_2$O, dichlorobis(bipyridyl)rhodium (III) chloride dihydrate, was prepared in accordance with a known method from ethanol solvent (Journal of the Chemical Society of 1965, page 1951–65 at page 1961). This complex (177.6 mg) was mixed in 20 mL of methanol and 20 mL of THF with 440 mg of NaOH and 2,740 mg of BAQ; and the resulting solution was degassed by applying a vaccuum. Hydrogen gas was then supplied to the reaction vessel at room temperature and atmospheric pressure. After about 1 h, the solution had changed color from reddish to deep brown, and absorption of hydrogen commenced.

After 4 additional hours of hydrogenation, the absorption of hydrogen slowed down or stopped at about the theoretical uptake of one equivalent of hydrogen (250 mL) per BAQ gram-molecule present. The reaction mixture was washed with degassed 0.5 molar HCl and toluene was added to extract the dihydroxy product. The appearance of fluorescence indicated presence of such product. The observed rate of hydrogenation was satisfactorily high.

EXAMPLE 2

This example was carried out using 2,770 mg of BAQ, 184.9 mg of the rhodium complex employed in Example 1, 500 mg of a strong anionic exchange resin chiefly in the basic form, 20 mL of methanol and 20 mL of THF. After an induction period of about 1 hour, the theoretical amount of hydrogen (260 mL) was absorbed by the reaction mixture over a period of about 4.5 hours at room temperature and atmospheric pressure.

EXAMPLE 3

(A) Hexadiene rhodium chloride dimer complex of formula (CH$_2$=CHCH$_2$CH$_2$CH=CH$_2$RhCl)$_2$ was prepared by the method of R. Cramer, J.A.C.S., Volume 86 of 1964, page 217.

Polystyrene was brominated as described by S. E. Jacobson et al., J.A.C.S., Volume 101 of 1979, page 6938. This polymer was then functionalized with bipyridene by procedure as in R. J. Card et al., Inorg. Chem. Volume 17 of 1978, page 2345. Analysis showed C–84.61%, H–7.24%, N–1.87%, i.e. a molecular weight of 1,497 per bipyridyl group.

The functionalized chloride polymer beads (4.95 g) and the hexadiene rhodium complex (2.20 g) were then added to degassed THF (mole ratio of 3:1 of Rh complex:bipyridyl groups) and the reaction mixture was degassed under argon while stirring for 2 hours. The solution became dark brown. Ammonium hexafluorophosphate (1.75 g) was added and stirring was continued for 30 minutes. The reaction mixture was filtered and the precipitate was washed with THF, water, toluene and ethyl acetate.

(B) The rhodium-containing polystyrene beads of Part (A) (251.2 mg), 2,700 mg of BAQ, 20 mL of methanol and 20 mL of THF were mixed and exposed to hydrogen gas at atmospheric pressure and room temperature. Upon standing overnight, the reaction mixture had absorbed 286 mL of hydrogen as compared to the theoretical amount equivalent to the BAQ of 252 mL. The polymer was filtered off from the solution and washed with THF. It was reused in two additional runs in which it was found that about the theoretical hydrogen was absorbed in each run.

(C) A cell was constructed by separating the two sides of a tank with a cellulose nitrate-acetate membrane. In the left compartment of the cell a solution was supplied having 3,000 mg of BAQ dissolved in 18 mL of diisobutyl carbinol mixed with 12 mL of alpha-methylnaphthalene. This solution was degassed by passing argon through for 1 hour. A closed reservoir vessel above and connecting to this side of the cell smoothed out pressure fluctuations in the compartment.

In the right hand compartment on the other side of the membrane, water was provided and was degassed with argon for 1 hour.

A palladium-on-carbon hydrogenation catalyst (235.9 mg) of 5% palladium content was added to the BAQ side of the cell, and hydrogen was bubbled through for 2 hours. Argon was bubbled through the water side.

Then oxygen was bubbled through the water side of the cell, and this aqueous phase was sampled after 1 hour and 3 hours. The analysis showed 3.3% of the theoretical hydrogen peroxide produced after 1 hour and 5.9% after 3 hours.

(D) In a repetition of the preceding test of hydrogen peroxide production through a membrane, using 290 mg of the Pd/C catalyst, analysis of the aqueous phase after 1 hour showed 5.3% of the theoretical hydrogen peroxide; after 3 hours showed 10.2% and after overnight reaction showed 36%. Hourly hydrogen peroxide production rate, in this quite primitive apparatus, of 0.12 mole per sq. cm of membrane surface was demonstrated.

EXAMPLE 4

Example 3 has repeated through step B to show that the hydrogenation of BAQ could occur in a solvent immissible with water (the 60:40 diisobutylcarbinol:alpha-methylnaphthalene mixture). The rhodium-containing polystyrene beads of Part (A) of Example 3 (270.4 mg), 2,640 mg of BAQ, 20 mL of methanol and 20 mL of THF were reacted as in Example 3 with 270 mL of hydrogen taken up (246 mL theoretical). The solution was then decanted off the polymer beads and a new solution was added: 2640 mg BAQ in 24 mL of diisobutylcarbinol and 16 mL of alpha-methylnaphthalene. The reaction was run as before. A slower reaction was observed in which 75 mL was taken up in a 90 hour period. This represents 17 turnovers of the rhodium catalyst, but only about 30% of the BAQ reduced.

EXAMPLE 5

On the basis of the above crude, preliminary tests of hydrogenation and oxidation, in compartments separated by a membrane, producing hydrogen peroxide, the best mode of carrying out their invention presently contemplated by the inventors is as follows.

An apparatus and procedure as illustrated in the accompanying drawing is used. In the drawing, reference numeral 1 represents a tank for hydrogenating BAQ. In the lower portion of the tank is the hydrogenation catalyst of (bipyridyl)rhodium(I) complex bound on polystyrene beads as used in Example 3 above, designated in the drawing by reference numeral 2. Reference numeral 4 designates a frit at the outlet at the bottom of tank 1 to hold back the polystyrene bead catalyst.

Hydrogen gas at about 100 p.s.i.g. (689 kPa) is supplied to the tank 1 by constant pressure inlet valve 6. A pump 8 circulates the reaction mixture from tank 1 to manifold 10 and up through vertical porous hollow fibers designated by numeral 12. In the diagram the fibers are shown much wider than what would actually be used, and only a few such fibers instead of the numerous fibers which would actually be used are shown. The reaction mixture exits from the upper end of these fibers into manifold 14 and thence returns through inlet pipe 16 to tank 1.

An aqueous phase containing oxygen is supplied to the interior of shell 18 via inlet 20 at the bottom of the shell and rises in the shell past the hollow porous fibers 12, which function as permeable membranes to separate the solution containing 2-(t-butyl)dihyroxyanthracene passing up the inside of the fibers from the aqueous phase containing oxygen passing up the outside of the fibers. Suitably these fibers are made of cellulose nitrate-acetate or other porous material which is wetted by the solution of BAQ in a solvent such as diisobutyl-carbinol/alpha-methylnaphthalene mixture. Horizontal baffle plates 22, having perforations therein, can be used to prevent mixing of the aqueous phase in the lower part of shell 18 from that in the upper part of the shell.

The aqueous phase, containing hydrogen peroxide product at concentration suitably at least 10%, is withdrawn from shell 18 at outlet port 24 at the top of the shell and diagonally opposite to the inlet port 20. This aqueous hydrogen peroxide can be used as such, or diluted, or concentrated further, as may be desired.

We claim:

1. In a process for production of hydrogen peroxide involving stages of (1) oxidation with elemental oxygen of a 2-alkyl-9,10-dihydroxyanthracene, dissolved in an organic solvent, to the corresponding alkylanthraquinone, and (2) catalytic hydrogenation of said dissolved alkylanthraquinone back to said alkyldihydroxyanthracene, the improvement which comprises catalyzing said hydrogenation by use of a water-insoluble (bipyridyl)-rhodium complex as hydrogenation catalyst.

2. Process of claim 1 wherein said (bipyridyl)rhodium complex is a rhodium(III) complex and the hydrogenation reaction mixture includes a base.

3. Process of claim 2 wherein said base is an anion exchange resin.

4. Process of claim 1 comprising carrying out the oxidation stage (1), and the reduction stage (2), simultaneously and continuously in adjoining zones in the same reaction vessel, using a porous membrane separating said zones which membrane is wetted and penetrated by a solution in organic solvent of said alkyldihydroxyanthracene; the said alkylanthraquinone, together with said hydrogenation catalyst and with said organic solvent, being in a first such zone to which elemental hydrogen is supplied and in such adjoining zone, water and said elemental oxygen being supplied; whereby such dihydroxyanthracene in the solution penetrating said membrane is oxidized to produce hydrogen peroxide in the aqueous solution and to regenerate the 2-alkylanthraquinone in the organic solvent, and withdrawing the aqueous solution containing hydrogen peroxide.

5. Process of claim 4 wherein said porous membrane is a cellulosic composition, said alkyldihydroxyanthracene is 2-(t-butyl)-9,10-dihydroxyanthracene, and said (bipyridyl)rhodium complex is the complex formed between 1,5-hexadiene rhodium chloride dimer complex and polystyrene containing bipyridyl ligands.

* * * * *